United States Patent [19]
Green et al.

[11] Patent Number: 5,654,736
[45] Date of Patent: Aug. 5, 1997

[54] APPARATUS FOR THE CONTROL OF AN ELECTROCHROMIC WINDOW

[75] Inventors: Mino Green, London; James Hampson, East Twickenham, both of United Kingdom

[73] Assignee: Societa' Italiana Vetro-SIV-S.p.A., San Salvo CH, Italy

[21] Appl. No.: 426,247

[22] Filed: Apr. 21, 1995

[30] Foreign Application Priority Data

Apr. 27, 1994 [IT] Italy ................. RM94A0241

[51] Int. Cl.⁶ ........................................... G09G 3/38
[52] U.S. Cl. ......................................... 345/105; 345/84
[58] Field of Search ........................ 345/49, 105, 84, 345/87, 207, 214; 359/265–275; 349/16; 361/101

[56] References Cited

U.S. PATENT DOCUMENTS

| | | | |
|---|---|---|---|
| 4,201,984 | 5/1980 | Inami et al. | 345/49 |
| 4,295,138 | 10/1981 | Nakauchi et al. | 345/105 |
| 4,322,133 | 3/1982 | Uede et al. | 345/105 |
| 4,479,121 | 10/1984 | Tabata | 345/105 |
| 4,512,637 | 4/1985 | Ballmer | 345/105 |
| 4,529,275 | 7/1985 | Ballmer | 359/265 |
| 4,529,873 | 7/1985 | Ballmer et al. | 359/275 |
| 4,535,329 | 8/1985 | Koyanagi et al. | 345/105 |
| 4,644,344 | 2/1987 | Larsen et al. | 345/105 |
| 4,896,030 | 1/1990 | Miyaji | 359/267 |
| 5,073,011 | 12/1991 | Ito et al. | |
| 5,365,365 | 11/1994 | Ripoche et al. | 345/105 |
| 5,384,578 | 1/1995 | Lynam et al. | 345/105 |
| 5,424,898 | 6/1995 | Larson et al. | 361/101 |
| 5,469,296 | 11/1995 | Ohno et al. | 359/265 |
| 5,581,406 | 12/1996 | Kobayashi et al. | 359/273 |

FOREIGN PATENT DOCUMENTS

| | | |
|---|---|---|
| 0078464 | 5/1983 | European Pat. Off. . |
| 0408427 | 1/1991 | European Pat. Off. . |
| 0568457 | 11/1993 | European Pat. Off. . |

OTHER PUBLICATIONS

Ntz Nachrichtentechnische Zeitschrift, vol. 28, 1975 Berlin, DE, pp. 196–200, J.H.J. Lorteije, "A Survey of Drive Methods for Gasdischarge, Light Emitting Diode, Liquid Crystal and Electrochromic Displays".

*Primary Examiner*—Steven Saras
*Attorney, Agent, or Firm*—Wenderoth, Lind & Ponack

[57] ABSTRACT

An apparatus for the control of an electrochromic window having a three-electrode structure (2, 8, 5) comprises a comparator (12) to maintain within safe limits the potential difference of the electrode (2) and the reference electrode (5), and a shunt unit (16) to switch off the power supply when the current falls below a lower limit and a unit for controlling the coloring density on the basis of the quantity of charge supplied or the optical density of the coloring (FIG. 2).

16 Claims, 3 Drawing Sheets

APPARATUS FOR THE CONTROL OF AN ELECTROCHROMIC WINDOW

BACKGROUND OF THE INVENTION

1. Field of the Invention

The present invention is concerned with the variable control of an electrochromic window. The work window is being used here as a generic term to mean an electrochemical structure which can be reversibly altered between the transparent colourless state and the transparent coloured state.

2. Description of the Prior Art

The current state of electrochromic window technology is that of a structure made of two active electrodes, which together form an electrochemical cell, this cell having other transparent conducting layers, and a transparent electrolyte arranged so that the overall structure changes colour density on the passage of an electric current. This colour change can be completely reversed on inversion of the current.

One such electrochromic window structure is a complex comprising two sheets of glass which act as the transparent external walls, coated on the inside with thin transparent conductor layers, and using two further suitable thin films as active electrodes for the system with a suitable electrolyte as the element for transmission of active ionic species. One of the two active electrodes is a thin film of tungsten oxide, whilst the other active electrode comprises a solid solution of lithium in a thin film of vanadium oxide (or a mixture of vanadium oxide and molybdenum oxide). The electrolyte used is a polymer made by dissolving lithium perchlorate in a suitable solution of propylene carbonate and polymethyl methacrylate.

The application of a potential difference across this window structure, with the negative potential on the tungsten trioxide, will cause a current to flow and the window to become coloured. If the current is reversed the window will become lighter in colour until finally becoming virtually colourless.

Electrochromic windows of a size suitable for automotive and architectural applications have been described in European patent application No. 0608203.

SUMMARY OF THE INVENTION

The problem addressed by this patent is the method for controlling an electrochromic window in such a way as to maintain the chemical integrity of the cell at all times during colouration or decolouration, while at the same time allowing the colour density of the window to be changed to the desired level and ensuring this colour change occurs uniformly across the window's area. The protection of the chemical integrity of the electrochromic cell is essential for the longer life of the window structure for buildings or cars whilst the uniformity of colouration or decolouration is desirable for the general appearance of windows during periods of change.

The object of the present invention is, therefore, to solve the problems mentioned above by providing a compact apparatus in conjunction with a suitably structured window so that the degree of colouration within the desired limits can be obtained with acceptable limits of window uniformity and life-time.

The above object is embodied in a control apparatus of an electrochemical electrochromic window for the control of the colour density thereof, said window including an electrolyte, a colouring electrode and a counter electrode in contact with said electrolyte, and a reference electrode showing a potential difference with respect to said colouring electrode, characterized in that it comprises:

an electronic comparator for comparing said potential difference with a potential selected in said comparator within safe working upper and lower limits for the transport of ions in said electrolyte and production of colouration or decolouration respectively of the window;

a constant current supply of pre-selectable initial current value for supplying the colouring current to the window;

a current regulator controlling the current supplied to the window according to the output of said comparator to maintain the potential difference within said safe working potential limits;

a shunt unit controlling said current supply to switch it off when the current in the window falls below a pre-selectable lower limit; and means for pre-selecting the colour density of the window and switching said current supply on or off to produce said colouring with said pre-selected density.

BRIEF DESCRIPTION OF THE DRAWINGS

The present invention is illustrated by reference to the accompanying drawings, in which.

DESCRIPTION OF THE PREFERRED EMBODIMENT

Figure 1:
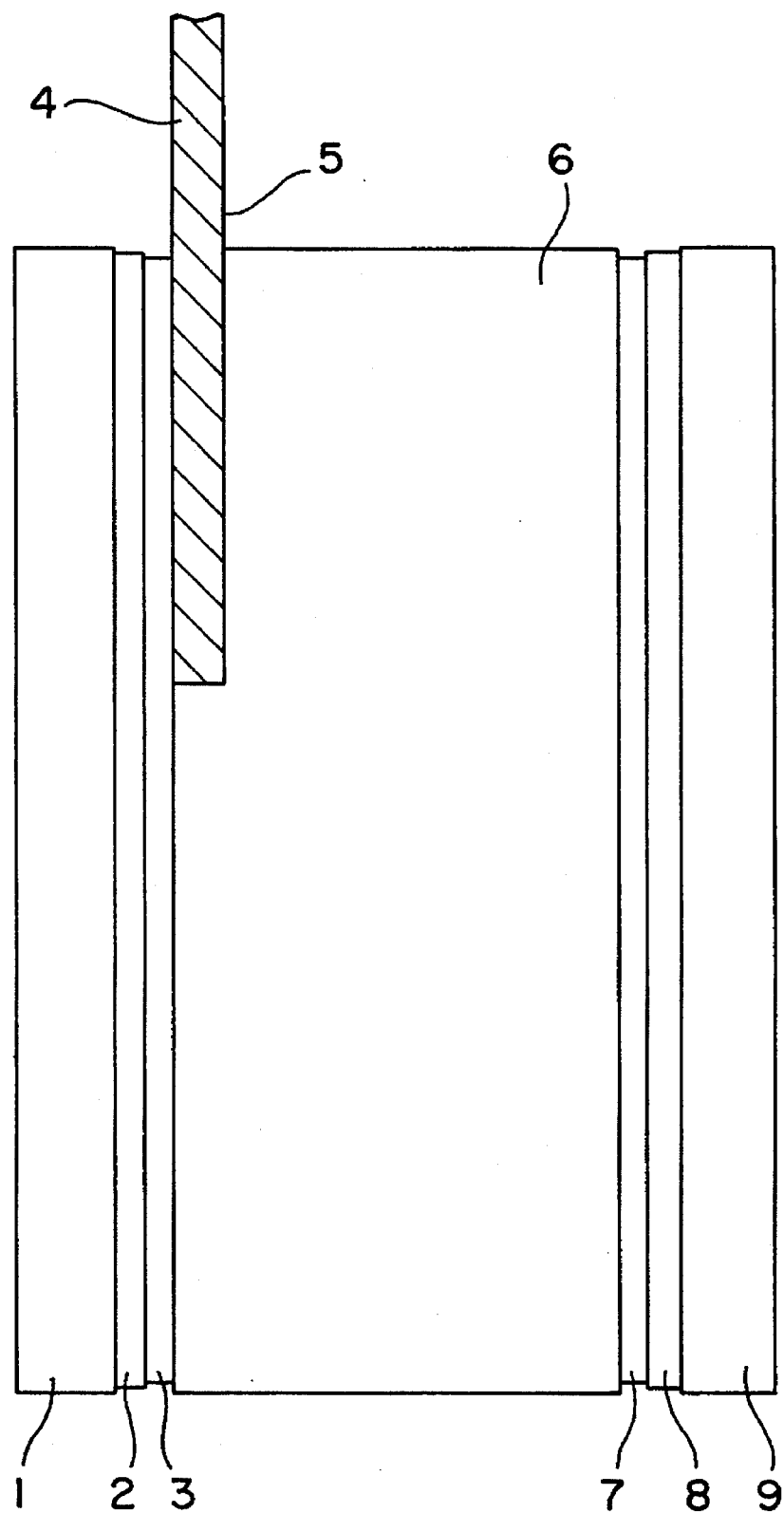
FIG. 1 is a schematic view of the three-electrode structure of the electrochromic window.

The control apparatus so described relates to a window with a three electrode structure, specifically the two active electrodes 3, 7 and a reference electrode 5 which draws an insignificant amount of current. FIG. 1 is an example of such an electrochromic window structure. In FIG. 1 two sheets of glass 1 and 9 are used as outer walls and each have a transparent conducting layer, preferably tin oxide, forming the electrode 2 and 8, respectively. These layers are themselves coated with an active colouring electrode of tungsten oxide 3 and an active counter electrode 7 of vanadium oxide. The electrolyte polymer 6, obtained by dissolving lithium perchlorate in a suitable known mixture of propylene carbonate and polymethyl methacrylate, acts as the transport medium for the lithium ions. A reference electrode, consisting of a thin strip of polyethylene terephthalate (PET) coated with a thin layer of gold 5, is inserted between the tungsten oxide layer 3 and the electrolyte polymer 6 with the gold facing the counter electrode. The electrochromic window is connected to the electrical circuit of the controller by wires connected to the two conductive electrodes 2 and 8.

Figure 2:
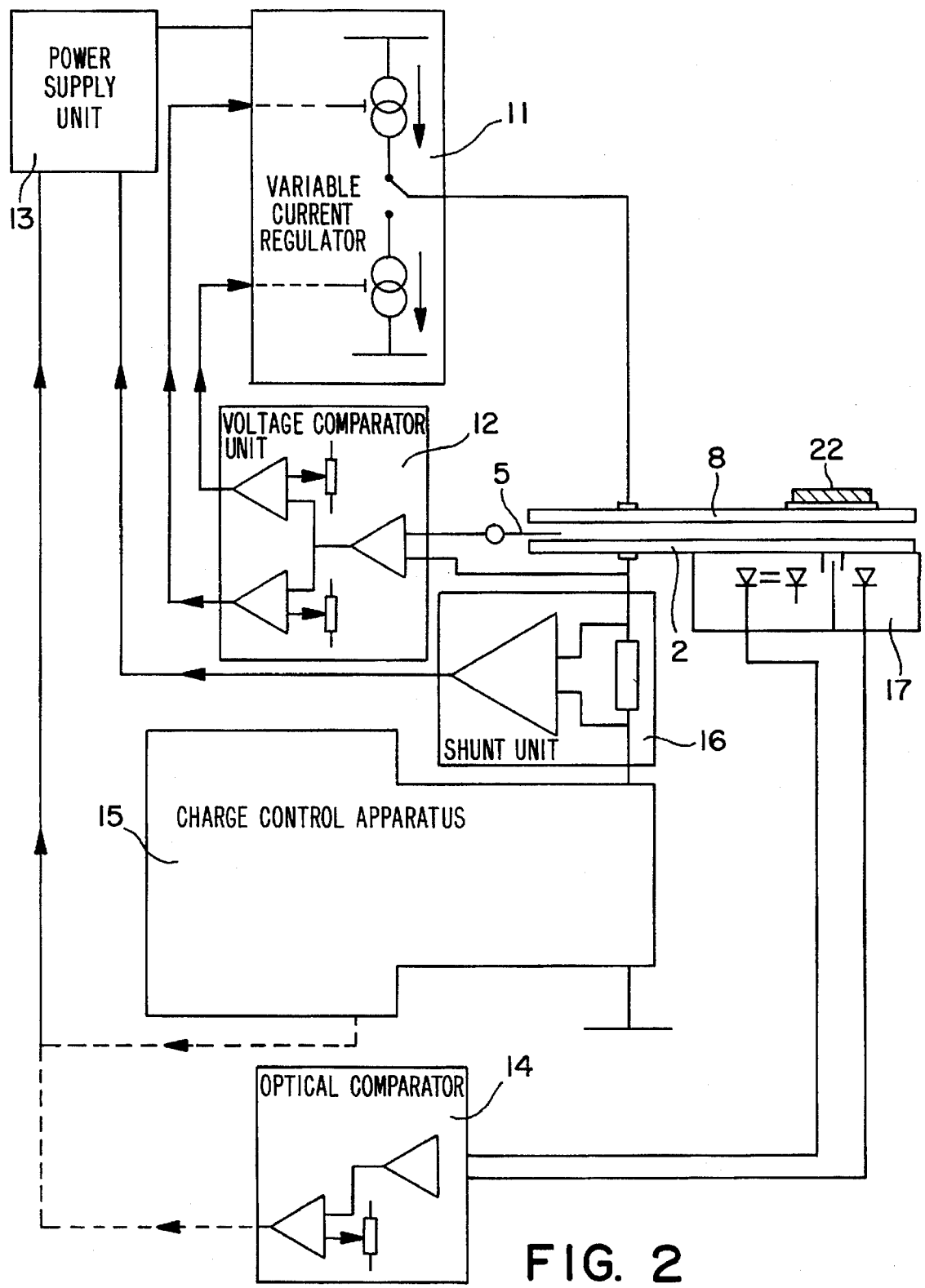
FIG. 2 is a schematic view of the functional parts of the controller, in which both charge controller unit and optical density controller unit are illustrated, whereas only one unit of control would actually be used.

The control apparatus shown in FIG. 2 is connected to the three electrodes of the electrochromic window and embodies a number of functional parts. A variable, dual-polarity current regulator 11 supplies current to the electrochromic window via the electrodes 2 and 8, and also sets an upper limit to this current. The current supplied by the regulator 11 is itself controlled during colouring and bleaching operations by the voltage comparator 12 which reduces the current supplied, if necessary, in order to maintain safe operation of the window. Power to the current regulator 11 is supplied by the power supply unit 13, and this unit is switched by either an optical density comparator system 14, or a total charge integrator unit 15. Additionally there is an interdiction current lower limit unit 16 which interdicts the power supply unit 13 at a pre-set minimum current.

The potential difference between the reference electrode 5 and the electrode 2 reflects the electrochemical condition of the window. It has been determined that with the combination of materials cited here that a reference electrode potential during colouration of up to about +1.2 V (with respect to electrode 2) represents an electrochemically safe condition. Similarly, during decolouration, a minimum value of about −1.2 V is deemed safe.

Thus, when it is desired to colour a window the power supply unit 13 is switched on. This action allows current at an initial pre-set magnitude to flow into the window through the regulator 11. The potential difference between electrodes 2 and 5 is compared with the safe colouration voltage limit set in the voltage comparator unit 12. If the potential at electrode 5 (with respect to electrode 2) rises to that set in the voltage comparator then the current supplied to the window is reduced so as to remain at the allowed upper voltage limit of +1.2 V. The colouring charge will continue to flow until either the predetermined quantity of charge has passed into the window, or as in an alternative control system, until a predetermined window optical density is achieved. With either control system it is of the essence that the maximum allowed potential difference between electrodes 5 and 2 is not exceeded.

On decolouration the potential difference between electrodes 5 and 2 is compared with the safe decolouration voltage limit in the voltage comparator 12. If the potential at electrode 5 (with respect to electrode 2) drops to that set in the voltage comparator then the current supplied to the window is reduced so as to remain at the allowed lower voltage limit of −1.2 V. On decolouration there is a further safety feature, specifically the lower limit of window current below which the power supply unit 13 is switched off by the shunt unit 16. The minimum decolouration current density is set at about 50 mA per square meter.

The four functional parts namely the power supply unit 13, the current regulator 11, the voltage regulator 12 and the shunt unit 16 are common parts to the controllers described here.

The charge controller unit is shown in FIG. 2 as 15, and comprises a current integrator and variable charge comparator. Operation of this controller is as follows. To colour the window the desired total charge (which corresponds to the desired window colour density) is pre-selected in the charge controller unit 15. This switches on the power supply 13, causing current to flow through the window via electrodes 2 and 8; the quantity of charge passed is continually measured. When the charge passed is equal to the pre-selected charge the power supply unit 13 is switched off.

Decolouration is accomplished by reversing the flow of current. The charge controller unit 15 is set to extract the desired quantity of charge, up to the limit of the total colouration charge. The power supply unit 13 is switched on and the current regulator 13 polarity is reversed causing a reverse current to flow through the window; again the quantity of charge passed is measured. Once the charge passed is equal to the pre-set value, the power supply unit 13 is switched off. The degree of decolouration achieved thus depends on the quantity of charge passed back through the window.

An alternative measurement is the optical density of the window. This method of control requires an optical sensor device 17 to be attached to the window. This device is shown in schematic form on FIG. 2 and in greater detail in FIG. 3. The device is essentially a split beam optical comparator. One example comprises a housing 18 which holds the two photo-detectors 19 and 20 and the single light source 21. The sensor unit 17 is attached to one side of the window, which for preference is the side of the window with the active electrode 3. A mirror 22 is positioned on the opposite side of the window as shown in both FIGS. 2 and 3.

The optical head described above is a single sided unit, i.e. one which contains both detectors as opposed to a unit where one detector is on one side of the window and the light source (and the other detector) is on the other side. The principle of controller operation is identical, since there is no fundamental difference in operation between a single sided and a dual sided optical device. The single sided device will probably be more convenient for automotive and architectural electrochromic systems.

Operation of the optical controller is now described. To colour the window the power supply unit 13 is switched on. The light source 21 in the optical sensor unit 17 is switched on. Current flows through the window, subject to the previously stated safety controls, causing the window to colour. The intensity of the light falling on detector 19 directly from the source 21 is compared with the intensity of the light received by detector 20, the light having passed twice through the window. The intensity ratio between detectors 19 and 20 is determined in the optical comparator unit 14 and compared with a pre-selected value which corresponds to the desired depth of colouration. When the pre-set and measured values are equal the power supply unit 13 is switched off and the colouration sequence is complete.

Similarly, to decolour a window, partially or completely, the new colour density is pre-selected in the comparator 14. This change in the desired optical colour density activates the power supply unit 13, causing a decolouration (reverse) current to flow because the new comparator level is now below the measured intensity ratio from the optical sensor 17. Current will continue to flow until the two become equal.

Figure 3:
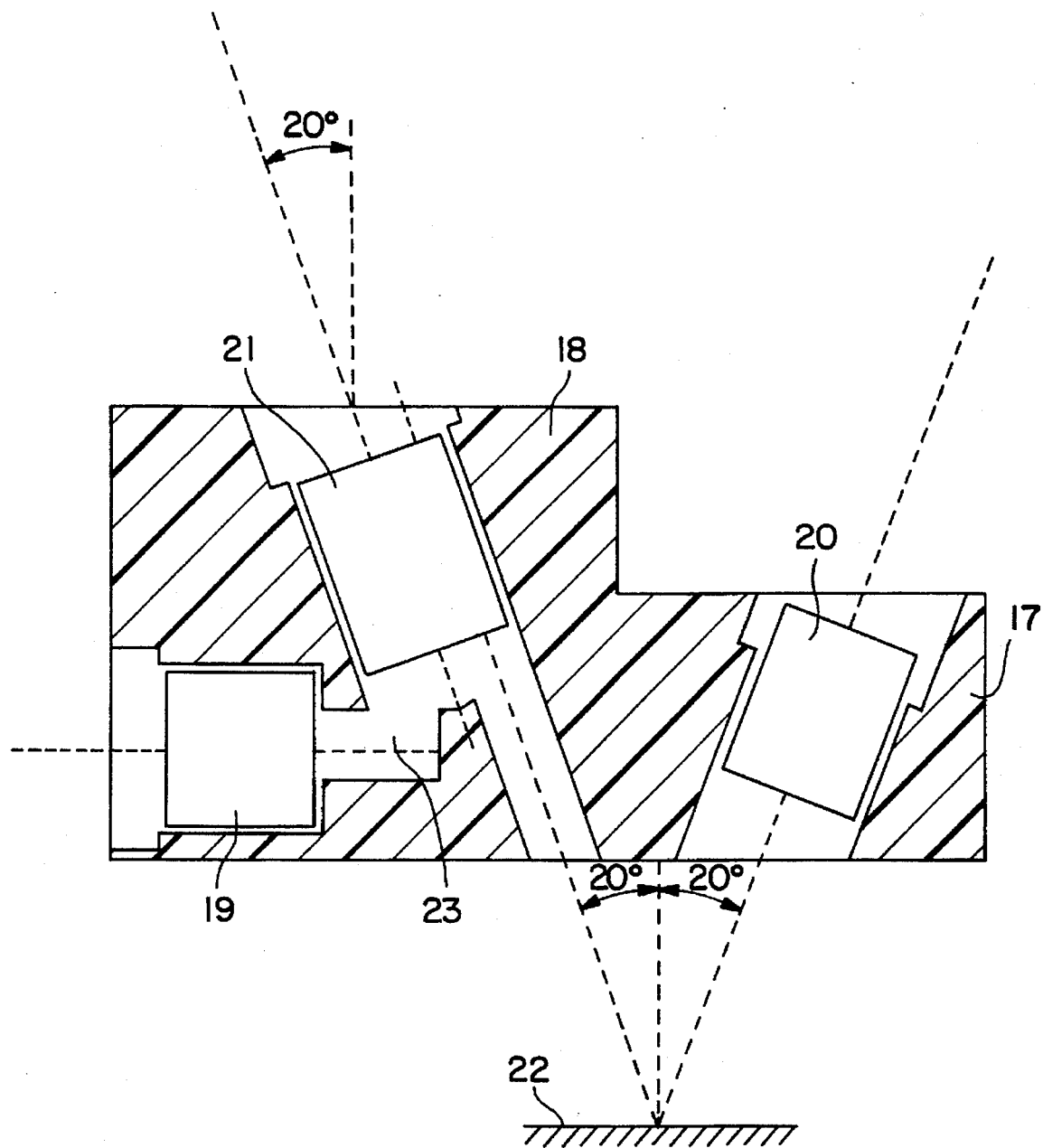
FIG. 3 is a cross-section view of an embodiment of optical sensor.

In example device shown in FIG. 3, the housing 18 should be made from an opaque, and preferably electrically insulating, material. Typically, opaque polyvinyl chloride is used, but another suitable material might be polyurethane. There are many other possibilities as well, too numerous to mention here. This design of optical sensor requires that the ratio of light received internally to the light reflected from mirror 22 be fixed throughout the life of the controller head. The light received internally may arrive at detector 19 via the channel 23 by reflection, as in this example, or by using a light guide. An alternative method would be to detect the light in a line-of-sight arrangement, thus eliminating the effect of changing reflectivity of the housing with age. Yet another alternative would be for the light from the source to be split and reflected by the housing for both the reference beam and also measurement beam.

The geometry of the housing arrangement 18 as shown in FIG. 3 depends upon internal reflection in the channel 23 for the reference beam. The housing 18 can easily be made compact, typical dimensions might be 25 mm long, 8 mm wide and 15 mm high. The axis of the source 21 and the axis of the detector 20 typically make an angle of 20° to the perpendicular as shown. Typical devices for this housing are now described. The light source 21 could be a solid state light emitting diode; for example, a high luminosity GaAlAs device, peak emission at about 637 nm and power output of about 700 mcd at 20 mA forward bias. The detectors 19 and 20 could be silicon photodiodes with peak sensitivity at about 700 nm and these would be the most suitable for this application.

The mirror on the far side of the window from the sensor head is positioned so as to reflect the light from the source 21 on to the detector 20. The mirror might typically be aluminium foil attached to the window surface by a clear adhesive. Alternatively, a mirror could be made by affixing a reflecting metal coating to the glass surface using a variety of metal deposition techniques including evaporation and ultrasonic soldering. The mirror is typically a square or circle of about 1 cm$^2$.

We claim:

1. A control apparatus of an electrochemical electrochromic window for the control of the colour density thereof, said window including an electrolyte, a colouring electrode and a counter electrode in contact with said electrolyte, and a reference electrode showing a potential difference with respect to said colouring electrode, comprising:

an electronic comparator for comparing said potential difference with a potential selected in said comparator within safe working upper and lower limits for the transport of ions in said electrolyte and production of colouration or decoloration respectively of the window;

a constant current supply of pre-selectable initial current value for supplying the colouring current to the window;

a current regulator controlling the current supplied to the window according to the output of said comparator to maintain the potential difference within said safe working potential limits;

a shunt unit controlling said current supply to switch it off when the current in the window falls below a pre-selectable lower limit; and means for pre-selecting the colour density of the window and switching said current supply (13) on or off to produce said colouring with said pre-selected density.

2. Apparatus as claimed in claim 1, in which said means for pre-selecting the colour density is a charge controller unit comprising a current integrator to determine the quantity of charge supplied by said current supply and a variable charge comparator to pre-select said quantity of charge and to compare the output of the integrator for controlling the switching off of said supply.

3. Apparatus as claimed in claim 1, in which said means for pre-selecting the colour density is an optical controller unit comprising an optical sensor device and an optical comparator unit, said sensor device including a light source and photodetectors to determine the intensity of light from said source and through the window respectively and to compare the ratio thereof in said comparator unit with a pre-selected ratio to control said supply.

4. Apparatus as claimed in claim 3, in which said optical sensor device comprises an opaque housing of electrically insulating material.

5. Apparatus as claimed in claim 4, in which said insulating material is polyvinyl chloride or polyurethane.

6. Apparatus as claimed in claim 3, in which said light source is a solid state light emitting diode and said photodetectors are silicon photodiodes.

7. Apparatus as claimed in claim 4, in which said housing contains both the photodetectors and a single light source and it is positioned on one side of said window and a mirror is positioned on the opposite side of said window.

8. Apparatus as claimed in claim 1 in which said current regulator is a variable, dual polarity current regulator.

9. Apparatus as claimed in claim 1, in which said window is an electrochemical cell having a three electrode structure with two active electrodes formed of transparent conductive layers of tin oxide coated with tungsten oxide and vanadium oxide respectively and a reference electrode of a strip of polyethylene terephthalate coated with gold and an electrolyte polymer obtained dissolving lithium perchlorate in a mixture of polypropylene carbonate and polymethyl methacrylate.

10. Apparatus as claimed in claim 9, in which said upper limit of potential difference between the reference electrode and the electrode coated with tungsten oxide is about +1.2 volts and said lower limit of potential difference is about −1.2 volts.

11. Apparatus as claimed in claim 4, in which said light source is a solid state light emitting diode and said photodetectors are silicon photodiodes.

12. Apparatus as claimed in claim 5, in which said light source is a solid state light emitting diode and said photodetectors are silicon photodiodes.

13. Apparatus as claimed in claim 5, in which said housing contains both the photodetectors and a single light source and it is positioned on one side of said window and a mirror is positioned on the opposite side of said window.

14. Apparatus as claimed in claim 6, in which said housing contains both the photodetectors and a single light source and it is positioned on one side of said window and a mirror is positioned on the opposite side of said window.

15. Apparatus as claimed in claim 11, in which said housing contains both the photodetectors and a single light source and it is positioned on one side of said window and a mirror is positioned on the opposite side of said window.

16. Apparatus as claimed in claim 12, in which said housing contains both the photodetectors and a single light source and it is positioned on one side of said window and a mirror is positioned on the opposite side of said window.

* * * * *